(12) United States Patent
Oh

(10) Patent No.: US 6,416,326 B1
(45) Date of Patent: *Jul. 9, 2002

(54) METHOD FOR TURNING PAGES OF A MULTI-PURPOSE LEARNING SYSTEM

(75) Inventor: Hyun-Kyung Oh, Seoul (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,013

(22) Filed: Mar. 27, 1998

(30) Foreign Application Priority Data

Mar. 27, 1997 (KR) ............................................ 97-10777

(51) Int. Cl.⁷ ................................................ G09B 17/00
(52) U.S. Cl. ........................................ 434/178; 434/317
(58) Field of Search ................................ 434/308, 309, 434/317, 322, 335, 178, 179

(56) References Cited

U.S. PATENT DOCUMENTS

| | | | | |
|---|---|---|---|---|
| 4,308,017 A | * | 12/1981 | Laughon et al. | 434/169 |
| 4,427,390 A | | 1/1984 | Manger | |
| 4,684,349 A | * | 8/1987 | Ferguson et al. | 434/308 |
| 4,729,564 A | * | 3/1988 | Kuna et al. | 463/9 |
| 4,809,246 A | | 2/1989 | Jeng | |
| 4,855,725 A | * | 8/1989 | Fernandez | 345/173 |
| 4,997,374 A | * | 3/1991 | Simone | 434/317 |
| 5,174,759 A | | 12/1992 | Preston et al. | |
| 5,209,665 A | | 5/1993 | Billings et al. | |
| 5,222,138 A | * | 6/1993 | Balabon et al. | 380/23 |
| 5,409,381 A | | 4/1995 | Sundberg et al. | |
| 5,413,486 A | * | 5/1995 | Burrows et al. | 434/317 |
| 5,417,575 A | | 5/1995 | McTaggart | |
| 5,433,610 A | | 7/1995 | Godfrey et al. | |
| 5,466,158 A | * | 11/1995 | Smith, III | 434/317 |
| 5,538,430 A | * | 7/1996 | Smith et al. | 434/178 |
| 5,575,659 A | * | 11/1996 | King et al. | 434/467 |
| 5,604,517 A | | 2/1997 | Filo | |
| 5,636,995 A | | 6/1997 | Sharpe, III et al. | |
| 5,644,693 A | * | 7/1997 | Fitzgerald et al. | 395/326 |
| 5,645,432 A | * | 7/1997 | Jessop | 434/322 |
| 5,663,748 A | * | 9/1997 | Huffman et al. | 345/173 |
| 5,813,861 A | * | 9/1998 | Wood | 434/169 |
| 5,820,379 A | * | 10/1998 | Hall et al. | 434/178 |
| 5,855,483 A | * | 1/1999 | Collins et al. | 434/322 |
| 5,897,324 A | * | 4/1999 | Tan | 434/317 |
| 5,991,594 A | * | 11/1999 | Froeber et al. | 434/317 |
| 6,041,025 A | * | 3/2000 | Ohga et al. | 369/30 |
| 6,201,947 B1 | * | 3/2001 | Hur et al. | 434/317 |
| 6,293,801 B1 | * | 9/2001 | Jenkins et al. | 434/236 |

OTHER PUBLICATIONS

US 5,009,603, 04/1994, Fong et al. (withdrawn)

* cited by examiner

Primary Examiner—Jeffrey A. Smith
Assistant Examiner—Michael B. Priddy
(74) Attorney, Agent, or Firm—Robert E. Bushnell, Esq.

(57) ABSTRACT

A method for turning pages of a multi-purpose learning system comprising a picture book package in a form of a cassette having a memory, a main body having a number of controllers for reading data stored in said memory, an audio/video output unit having a monitor and a speaker for outputting audio and video signals processed by said controllers. The method includes the steps of setting circuits of the main body to a standby mode, displaying a starting display having page icons which can be selected by an user to turn pages to proceed in interacting with the multi-purpose learning system, determining whether one of said page icons displayed on the starting display is selected by the user, and outputting the corresponding server display data of the selected page to the audio/video output unit for a visual display. Since the page icons can be displayed in the starting display on the monitor to be selected by the user, a more simplified multi-purpose system possible to have a virtually unlimited maximum number of pages can be provided.

8 Claims, 5 Drawing Sheets

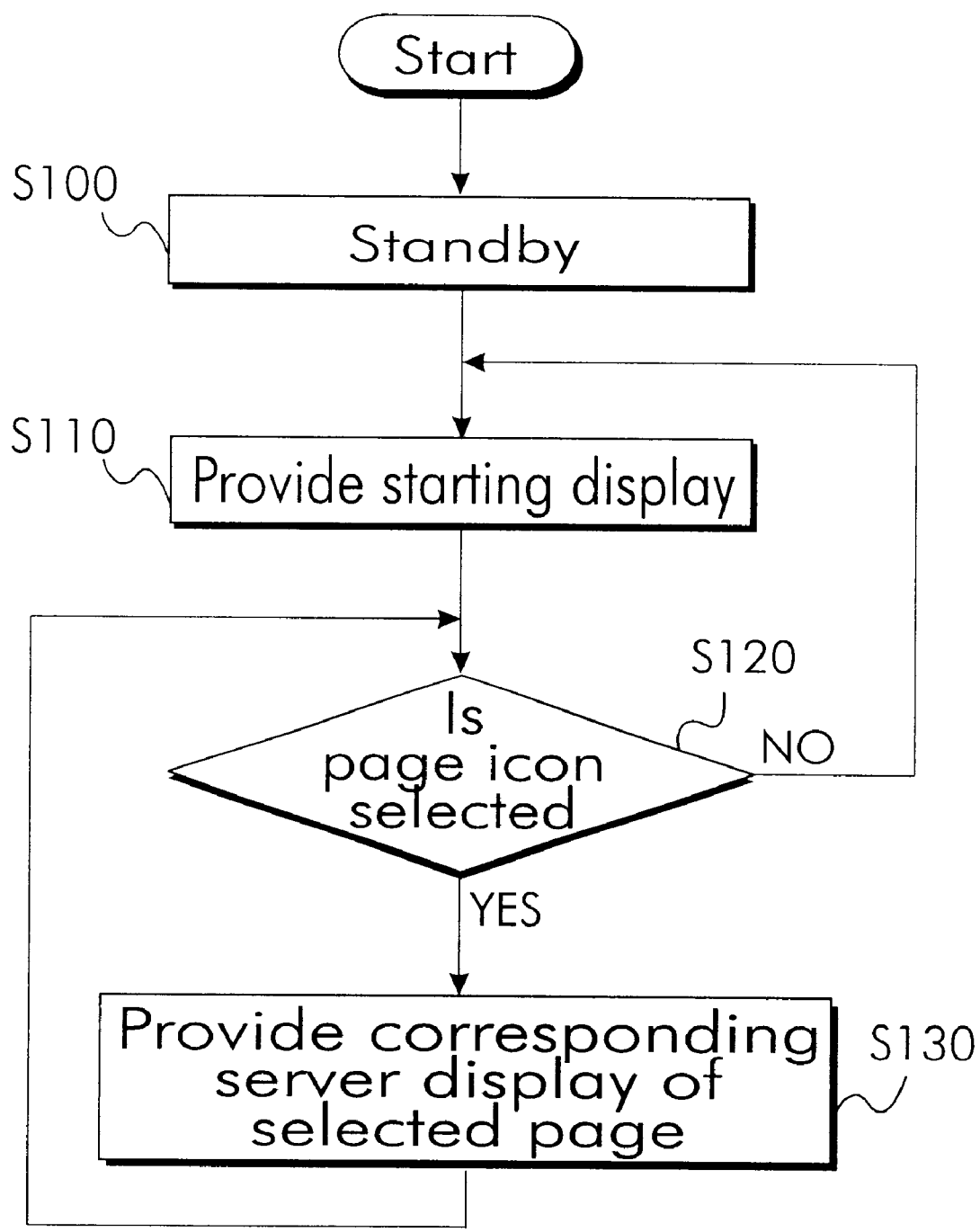

METHOD FOR TURNING PAGES OF A MULTI-PURPOSE LEARNING SYSTEM

CLAIM FOR PRIORITY

This application makes reference to, incorporates the same herein, and claims all benefits accruing under 35 U.S.C. §119 from an application for METHOD FOR TURNING PAGES OF A MULTI-PURPOSE LEARNING SYSTEM earlier filed in the Korean Industrial Property Office on the 27$^{th}$ of Mar. 1997, and there duly assigned Serial No. 10777/1997, a copy of which application is annexed hereto.

BACKGROUND OF THE INVENTION

1. Technical Field

The present invention relates to a multi-purpose learning system, and more particularly, relates to a method for turning pages of a multi-purpose learning system by allowing a user to select page icons displayed on a monitor.

2. Related Art

Due to technological improvements in electronics, many educational related learning systems for toddlers and children have been developed. The latest trend in educational electronics is to develop learning systems that provide high quality audio and visual stimulation while encouraging a child to use his or her imagination. Examples of such educational systems are disclosed in U.S. Pat. No. 5,009,603 for Electronic Educational Video System issued to Fong et al., U.S. Pat. No. 5,174,759 for TV Animation Interactively Controlled By The Viewer Through Input Above A Book Page issued to Preston et al., U.S. Pat. No. 5,209,665 for Interactive Audio Visual Work issued to Billings et al., U.S. Pat. No. 5,409,381 for Educational Display Device And Method issued to Sundberg et al., U.S. Pat. No. 5,433,610 for Educational Device For Children issued to Godfrey et al., and U.S. Pat. No. 5,604,517 for Electronic Drawing Device issued to Filo. Such learning systems are educational, yet maintain a child's interest and are suitable for a small child to use.

Moreover, advanced learning systems as disclosed in, for example, U.S. Pat. No. 5,636,995 for Interactive Story Book And Graphics Tablet Apparatus And Methods For Operating The Same issued to Sharpe, III et al., have incorporated multi-media technology to conventional story books and electronic books as disclosed, for example, U.S. Pat. No. 4,427,390 for Educational Book-Like Toy issued to Manger, U.S. Pat. No. 4,809,246 for Sound Illustrated Book Having Page Indicator Circuit issued to Jeng, U.S. Pat. No. 5,417,575 for Electronic Book issued to McTaggart. Some learning systems contain capability to output audio/video (A/V) signals through an A/V unit, like a television, for children to watch and listen to the sound of the book that they are reading. Moreover, such systems are interactive using touch-screen technology. Therefore, when the child selects a certain picture icon, the related A/V representations will be audibly and visually provided through the television. For example, when a child selects a specific scene from a story book, the child can see the corresponding picture and listen to the sound of the story. Since such systems interestingly incorporate story book pictures and A/V representations through the television or any other A/V units, children can enhance their learning by actively interacting with such machines. For example, U.S. Pat. No. 5,636,995 issued to Sharpe, III et al., discloses an interactive learning system that contains a picture book with picture icons. When an icon is selected by a child, a corresponding video is displayed on an audio/visual equipment. In many advanced multi-purpose learning systems, lessons are available in interchangeable educational packages to maintain the child's interest as well as enhance the child's ability in different aspects of development, such as writing, drawing, and communication skills.

Contemporary multi-purpose learning systems, as I have observed however, are limited to the number of pages of the picture book available as well as the number of page sensors installed in the main body for turning pages. As a result, extension in the availability of pages and the turning of those pages in multi-purpose learning systems are desirable.

SUMMARY OF THE INVENTION

Accordingly, it is therefore an object of the present invention to provide an improved multipurpose learning system and a method for turning pages of a picture book package.

It is also an object to provide a multi-purpose learning system comprising a picture book package having a memory to store multi-media information in multiple pages; a main body having controllers for reading multi-media information stored from the memory; and an A/V output system having a monitor and a speaker to provide A/V signals representations processed by the controllers.

It is further an object to provide a method for turning pages in a multi-purpose learning system by providing a server display and a starting display where a number of page icons are displayed in a predetermined position to be selected to turn as many pages as programmed in the picture book package.

These and other objects of the present invention can be achieved by a multi-purpose learning system which includes a picture book package in a form of a cassette having a memory, a main body having a number of controllers for reading data stored in said memory, an audio/video output unit having a monitor and a speaker for outputting audio and video signals processed by said controllers, and a process of turning pages of the picture book package comprising steps of: setting a book having a number of pages each containing pictures and related picture icons for user selection and interaction with the multi-purpose learning system; setting the controllers of said main body to a standby mode; providing a visual display of a starting display having page icons via the audio/video output unit which can be selected by the user to turn pages for interaction with the multi-purpose learning system; determining whether one of the page icons displayed on the starting display is selected by the user; and providing a visual display of corresponding server display data of the selected page via the audio/video output unit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 6 is a flow chart showing sequences of a method for turning pages of the multi-purpose learning system according to the principles of the present invention.

DETAILED DESCRIPTION OF THE PREFERRED EMBODIMENT

Figure 1:
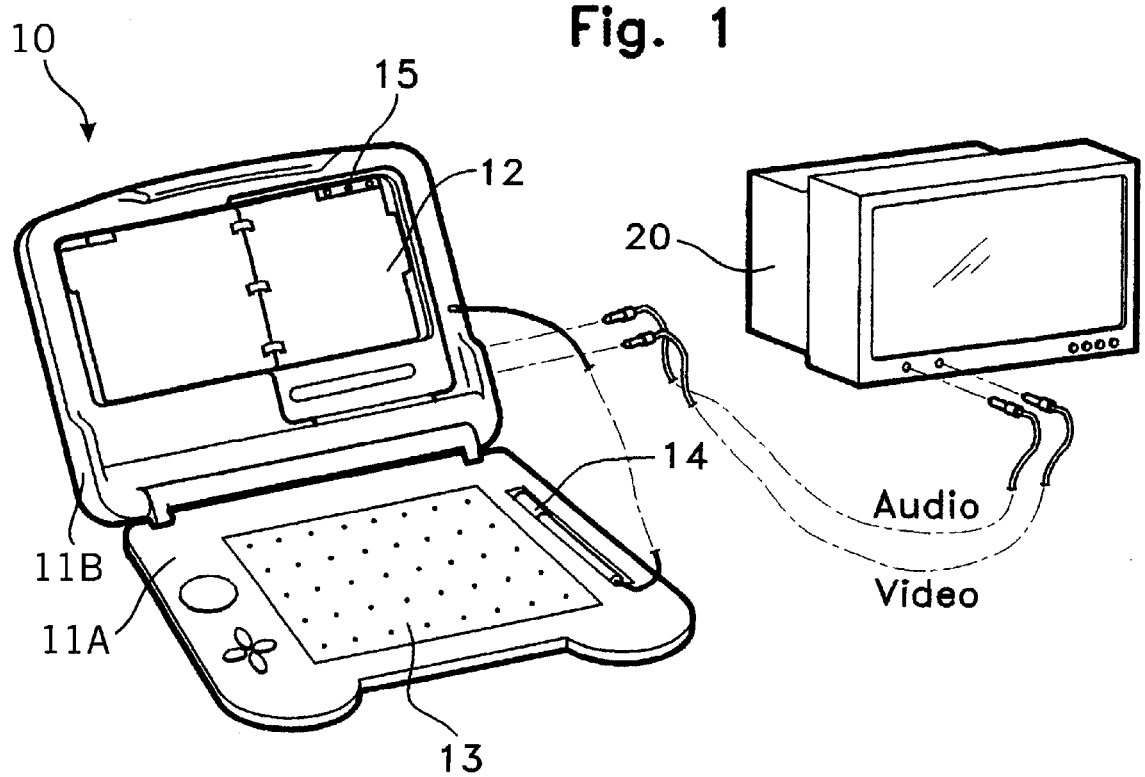
FIG. 1 is a schematic plan view of a multi-purpose learning system.
Figure 2:
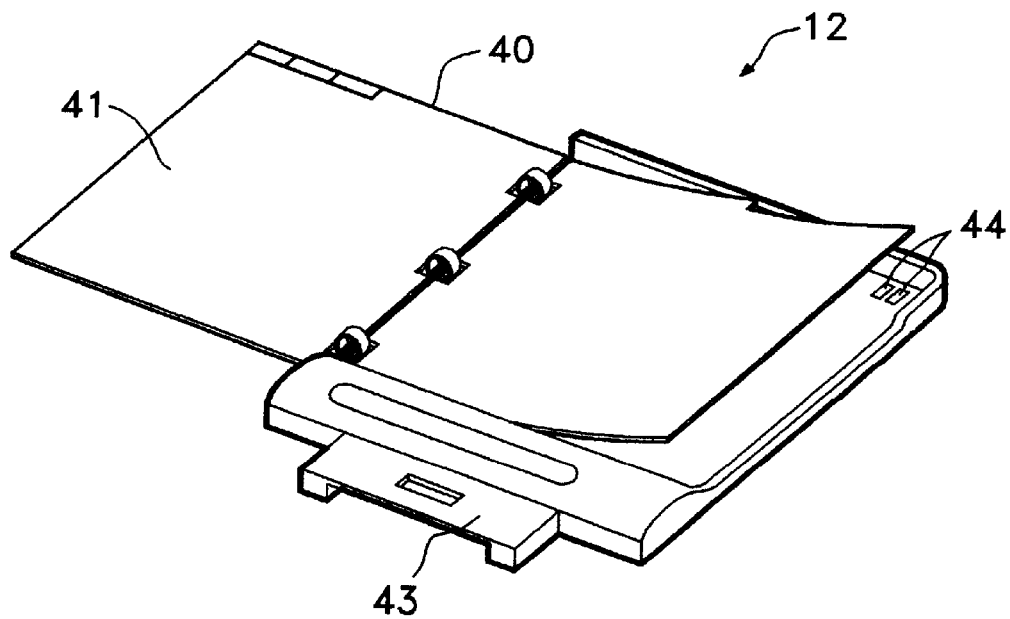
FIG. 2 is a perspective view of a typical story book package having pictures.

Referring now to the drawings and particularly to FIG. 1, which illustrates an advanced multi-purpose learning system using a story book package with a typical technique of turning pages as shown in FIG. 2. As shown in FIG. 1, the typical multi-purpose learning system 10 has a main body 11A and a flippable cover 11B having a story book package 12 detachably fixed thereon.

The flippable cover 11B of the main body 11A includes a number of controllers for controlling operations of the learning system 10. The flippable cover 11B also includes an audio output terminal and a video output terminal for respectively outputting related audio and video representations of the picture book to a separate A/V output unit 20, e.g. a television.

The main body 11A includes a touch pad 13 and an electronic pen 14 for selecting the corresponding picture icon of the picture which the child wants to peruse for more detail. In other words, when the operating mode of the electronic pen 14 is selected, controllers of the main body 11A follow movement of the electronic pen 14 on the touch board 13 to direct movement of a cursor on the A/V output unit 20. Therefore, users can select one of the picture icons displayed in the monitor by pointing the cursor on the picture icon and click it with the electronic pen 14.

Figure 3:
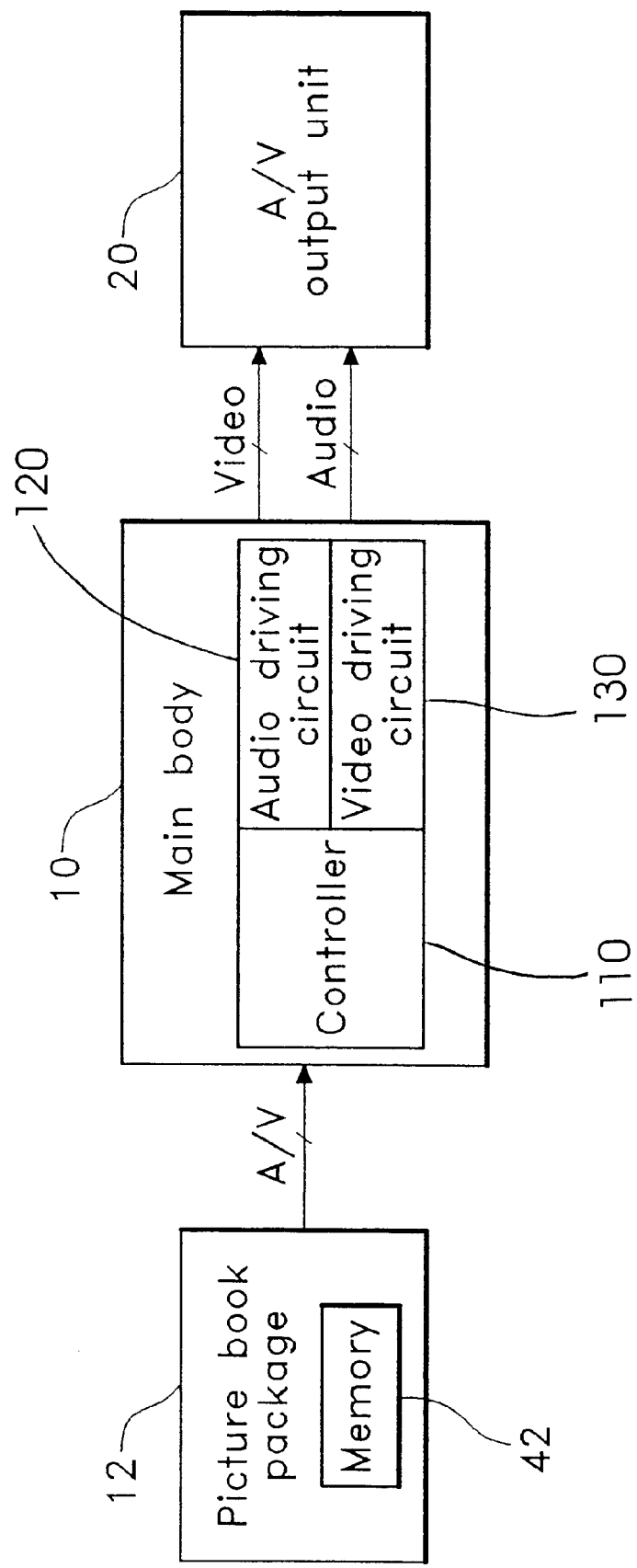
FIG. 3 is a block diagram of a multi-purpose learning system.

Referring to FIG. 2 which illustrates a configuration of the picture book package 12, and FIG. 3 which illustrates a system configuration of the multi-purpose learning system 10 including the picture book package 12. The picture book package 12 is made of a case having a predetermined size which fits comfortably in the flippable cover 11B of the main body 11A. The picture book package 12 includes a story book 40 having a number of pages each page 41 containing pictures attached to the outer face of the case; a memory 42 containing the related multi-media information of each picture of the story book 40 installed on the inner face of the case; and a connector 43 located on the inner face of the package 12 for being detachably fixed to the flippable cover 11B. The main body 11A includes a controller 110 for controlling general reproduction operations of multi-media information of the picture book package 12, an audio driving circuit 120 and a video driving circuit 130 for controlling the A/V representations of the multi-media information data via the A/V output unit 20.

The operation of turning the picture book pages of the typical multi-purpose learning system will now be described with reference to FIGS. 1–3 hereinbelow.

First, a picture book package 12 of a selected subject matter is inserted in the corresponding area of the flippable cover 11B of the main body 11A. Afterwards, when power is turned on, the corresponding A/V representations of the picture book package 12 is output to the A/V output unit 20. Each page 41 of the picture book package 12 has a slot having its own predetermined size on the upper right part so that sensors can determine the right page. In other words, when the picture book package 12 is inserted in the corresponding area of the main body 11A, the predetermined number of page sensors 15, which are installed on the upper portion of the flippable cover 11B in the corresponding area of the slots, can sense each page 41. Further, if the picture book package 12 has a predetermined number of slots 44, the page sensors 15 are exposed to sense the slot of each page.

Consequently, as the child (i.e., user) turns the page 41, the controller 110 of the main body 11A can determine the right page when the page sensors 15 sense the size of a slot. The related controllers (i.e., audio driving circuit 120 and video driving circuit 130) of the main body 11A read the multi-media information, which contains A/V signals corresponding to a current page for output from memory 42 of the picture book package 12 to the A/V output unit 20. Therefore, as the user turns the page 41, the controller 110 of the main body 11 outputs the corresponding video representation of the turned page to the A/V output unit 20.

Subsequently, when the user selects one of the picture icons in the picture book with the electronic pen 14, the corresponding A/V representations can be seen and heard through the A/V output unit 20. For example, if a sun icon is selected, the user may able to see the sun rising from the east and setting in the west through the television. Moreover, if a cloud icon is selected, then the user may able to see the cloud floating in the air.

The method of turning the pages of the typical multi-purpose learning system as described with reference to FIGS. 1–3 is, however, limited to the number of pages of the picture book available as well as the number of page sensors installed in the main body for turning pages. In particular, the maximum number of pages of the picture book 12 is limited to only six pages. As a result, extension in the availability of pages and the turning of those pages in multi-purpose learning systems are desirable.

Figure 4:
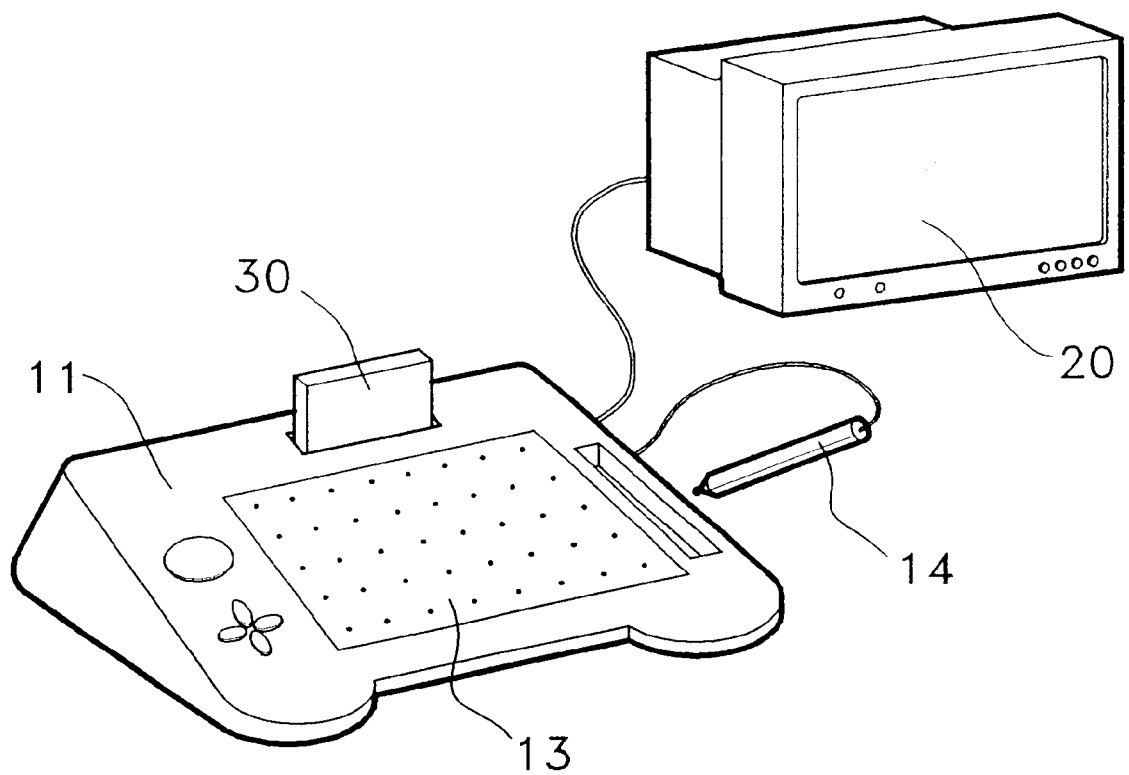
FIG. 4 is a schematic plan view of a multi-purpose learning system incorporating a method for turning pages of a story book package according to the principles of the present invention.

Turning now to FIG. 4 which illustrates an advanced multi-purpose learning system using a novel method for turning pages according to the principles of the present invention. As shown in FIG. 4, the multi-purpose learning system includes a main body 1 having a controller for controlling general operation of the system; a picture book cartridge 30 detachably fixed to the slot located in a predetermined area of the main body 11 and containing a memory 42 which stores multimedia information; an A/V output unit 20 (i.e., monitor with speakers) for providing a visual display of A/V representations of the multi-media information data output from the main body 11. In addition, the multi-purpose learning system main body 11 includes a number of controllers for controlling general operations of reproducing the multi-media information of the picture book package 30 to the A/V output unit 20. Moreover, an audio driving circuit and a video driving circuit are included for controlling the A/V signals output through the A/V output unit 20.

FIG. 6 is a flow chart showing sequences of a method for turning pages of the multi-purpose learning system according to the principles of the present invention. The method for turning pages of the multi-purpose learning system includes a step S100 for setting all the controllers of the main body 11 and parameters of the software to a standby mode; a step S110 for displaying a starting display by reading the corresponding data from the memory 42 in the A/V output unit 20; a step S120 for determining whether the user has selected one of the page icons; and a step S130 for outputting the corresponding A/V representations to the A/V output unit 20 when determined that one of the page icons has been selected.

The following describes the method for turning pages of the multi-purpose learning system according to the principles of the present invention in detail with reference to FIG. 6. First of all, when power is turned on, all the circuits related to the controllers of the main body 11 and parameters of the software is set to a standby mode at step S100. Afterwards, the controller of the main body 11 provides a visual display of the starting display in the A/V output unit 20 (i.e., monitor) after reading the necessary data from the memory 42 installed in the picture book cartridge 30 at step S110.

Figure 5A:
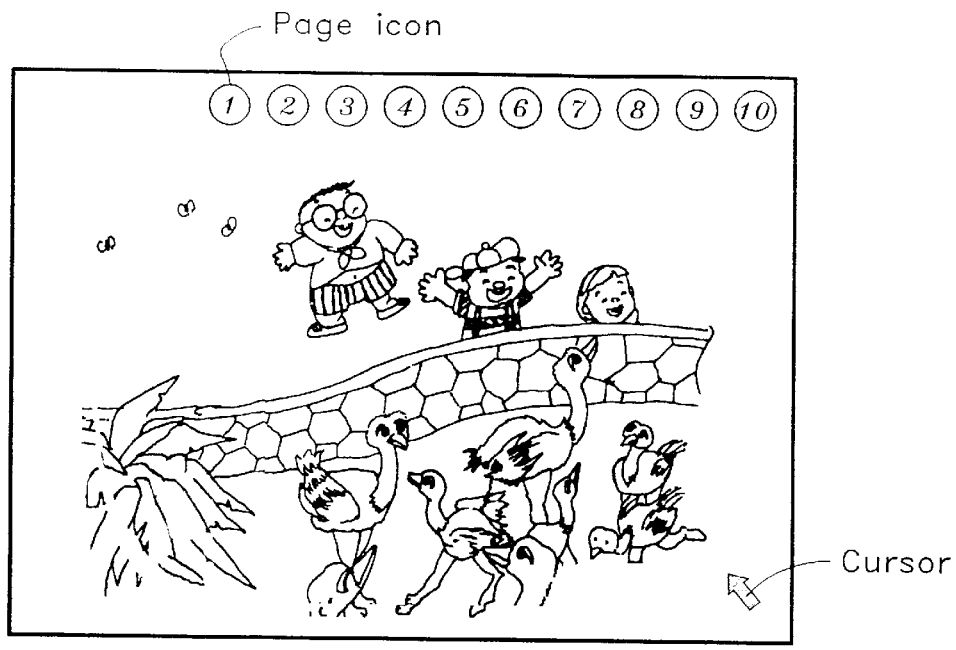
FIG. 5A is a sectionally schematic view showing an example of a starting display according to a preferred embodiment.
Figure 5B:
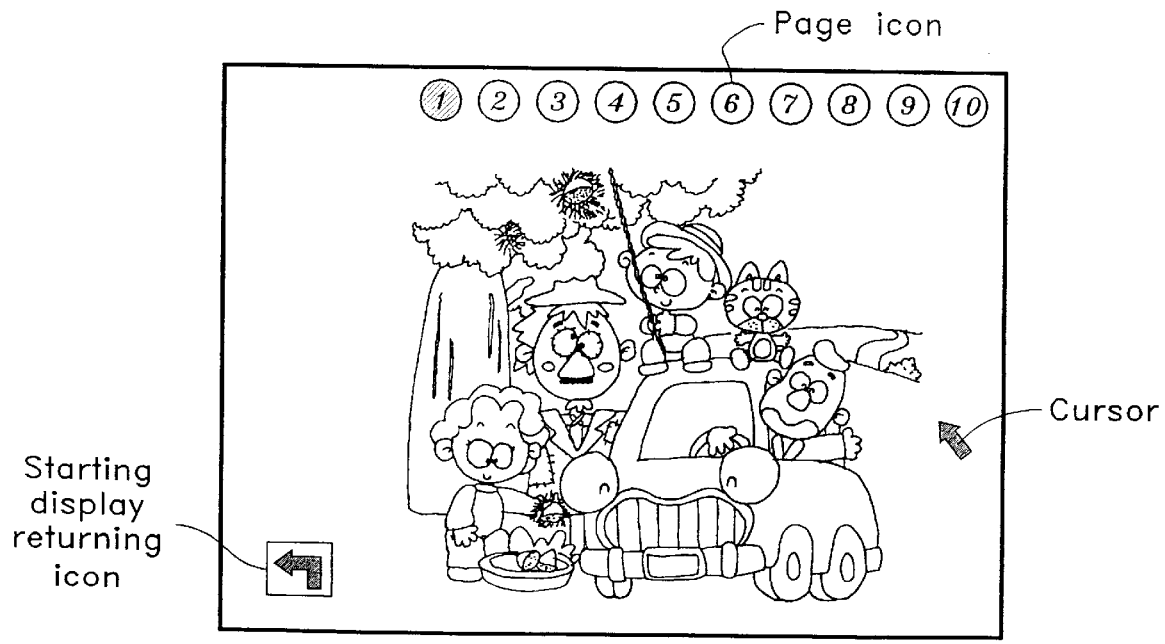
FIG. 5B is a sectionally schematic view showing an example of a server display according to a preferred embodiment.

The starting display is shown in FIGS. 5A and 5B as consisting of a predetermined number of page icons indicating page numbers. The page icons are displayed in a predetermined position along with an appropriate illustration. When one of the page icons, which are sequentially numbered from the first page to the last page, is selected by the user, then the necessary display will subsequently appear on the A/V output unit 20. Therefore, the user is free to choose a desirable page based on the story of the picture book package 30.

When the user selects one of the page icons by moving the electronic pen 14 on a touch pad 13 of the main body 11, the controller reads the data of the subsequent display, known as a server display, from the memory 42 to output the corresponding A/V representations to the A/V output unit 20. In other words, after step S110, the system determines whether the user has selected one of the picture icons at step S120. When the system determines that one of the picture icons has been selected, the controller reads the necessary data from the memory 42 and outputs the corresponding server display to the A/V output unit 20 at step S130. However, when the system determines that no selection has been made, the process is reverted back to step S110 to receive a selection. In other words, the user can select one of sequentially numbered page icons located on a predesignated position of the starting display with the electronic pen 14 to conveniently turn pages right in the monitor. Moreover, there is a return icon on every server display for returning to the starting display. Finally, the page icons can be displayed on a predesignated position of every server display. In such a situation, the page icon of the selected page should be differentiated from other page icons by hiding the page icon or having a different color.

As described above, the method of turning pages of a multi-purpose learning system according to the principles of the present invention conveniently eliminates the need for a picture book and page sensors. As a result, a much more simplified system can be provided. Furthermore, because the page icons can be displayed in the starting display on the monitor to be selected, the maximum number of pages allowed by the conventional multi-purpose system becomes virtually unlimited.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for operating a multi-purpose learning system, comprising the steps of:

entering a standby mode of the system when a main body of the system is turned on;

reading data from a picture book cartridge inserted in the main body of the system;

outputting to an audio/visual output unit a starting visual display including an icon for each displayable page of the picture book at a fixed predetermined position on the audiovisual output unit, and outputting sound corresponding to the starting visual display;

when a page icon is selected, outputting to the audiovisual output unit a visual display of the selected page of the picture book with the page number icons for all of the displayable pages of the picture book superimposed at the fixed predetermined positions on the visual display of the selected page, and outputting sound corresponding to the selected page of the book; and when a return icon displayed on the audiovisual output unit is selected, outputting to the audiovisual output unit the starting visual display including an icon for each displayable page of the picture book at a fixed determined position on the audiovisual output unit, and outputting sound corresponding to the starting visual display.

2. The method of claim 1, further comprising:

said steps of selecting the page number icon and return icon comprising touching a touchpad with an electronic pen.

3. The method of claim 1, further comprising:

said steps of outputting the visual display and sound comprising reading data by a controller from a memory and outputting display information to the audiovisual output unit.

4. The method of claim 1, further comprising the steps of:

inserting the picture book cartridge containing the audiovisual information of a book into the main body of the multi-purpose learning system; and said step of outputting the visual display and sound comprising reading of data by a controller from the cartridge and outputting display information to the audiovisual output unit.

5. The method of claim 4, further comprising the steps of:

turning the multi-purpose learning system on and setting a controller of the system to a standby mode;

then inserting the cartridge;

then displaying the starting display after reading the necessary data from the cartridge.

6. The method of claim 1, further comprising:

in said step of displaying page number icons, hiding the page number icon corresponding to the currently displayed page.

7. An apparatus for a multi-purpose system, comprising:
a main body having a slot for accepting a memory cartridge;
a controller in the main body;
a memory connected to the controller, said memory comprising the memory cartridge inserted into said slot;
an audiovisual output unit electrically connected to the controller;
controller means for outputting multimedia information corresponding to the page of a book on the audiovisual output unit and displaying page number icons on the audiovisual output unit superimposed on the displayed page of the book; and
selection means connected to the main body for selecting a displayed page number icon.

8. The apparatus of claim 7, further comprising:
said selection means comprising a touchpad in the main body and an electronic pen connected to the main body.

* * * * *